(12) United States Patent
Needham

(10) Patent No.: US 8,274,028 B2
(45) Date of Patent: Sep. 25, 2012

(54) COUNTERWEIGHTED ACTIVE TRACKING SOLAR PANEL RACK

(75) Inventor: Christopher Needham, Sandy Spring, MD (US)

(73) Assignee: SunEdison, LLC, Baltimore, MD (US)

( * ) Notice: Subject to any disclaimer, the term of this patent is extended or adjusted under 35 U.S.C. 154(b) by 882 days.

(21) Appl. No.: 12/395,231

(22) Filed: Feb. 27, 2009

(65) Prior Publication Data

US 2009/0223315 A1 Sep. 10, 2009

Related U.S. Application Data

(60) Provisional application No. 61/031,868, filed on Feb. 27, 2008.

(51) Int. Cl.
*F24J 2/38* (2006.01)
*G01C 21/02* (2006.01)

(52) U.S. Cl. ............. 250/203.4; 250/203.1; 126/573; 126/600; 136/246

(58) Field of Classification Search ............... 250/203.1, 250/203.3, 203.4; 136/243, 246; 126/573, 126/600, 605
See application file for complete search history.

(56) References Cited

U.S. PATENT DOCUMENTS

| 4,175,391 | A | 11/1979 | Baer | |
|---|---|---|---|---|
| 4,202,321 | A | 5/1980 | Volna | |
| 4,387,702 | A | 6/1983 | Murphy et al. | |
| 7,240,674 | B2 | 7/2007 | Patterson | |
| 2006/0201498 | A1* | 9/2006 | Olsson et al. | 126/605 |
| 2009/0025708 | A1* | 1/2009 | Shingleton | 126/600 |

* cited by examiner

*Primary Examiner* — Kevin Pyo
(74) *Attorney, Agent, or Firm* — Armstrong Teasdale LLP

(57) ABSTRACT

An active tracking solar assembly includes a main actuator cable and a secondary cable having a first end and a second end. The first end is connected to the main actuator cable and the second end is connected to a roof weight. An actuator bar has a counter weight attached to a first end and a first pulley attached to a second end, and the secondary cable engages the first pulley.

19 Claims, 4 Drawing Sheets

COUNTERWEIGHTED ACTIVE TRACKING SOLAR PANEL RACK

This application claims priority under 35 U.S.C. §119 to Provisional Patent Application No. 60/031,868 entitled: "Counterweighted Active Tracking Solar Panel Rack," filed on Feb. 27, 2008, the disclosure of which is incorporated by reference herein in its entirety.

FIELD OF THE INVENTION

Embodiments of the present invention relate generally to methods and systems for active tracking solar panel racks.

DESCRIPTION OF RELATED ART

One obstacle in roof-top tracking of solar panels involves the uneven distribution of wind forces inherent to the rigidly connected actuator design.

The description herein of disadvantages and deleterious properties associated with known compositions, methods, and systems is in no way intended to limit the scope of the invention to their exclusion. Indeed, embodiments of the invention may include portions of, or one or more known compositions, methods, and systems without suffering from the disadvantages and deleterious properties.

SUMMARY OF THE EMBODIMENTS

One embodiment of the invention encompasses a counterweighted active tracking solar panel rack.

Other objects, features, and characteristics of the present invention will become apparent upon consideration of the following description and the appended claims.

DETAILED DESCRIPTION

Figure 1:
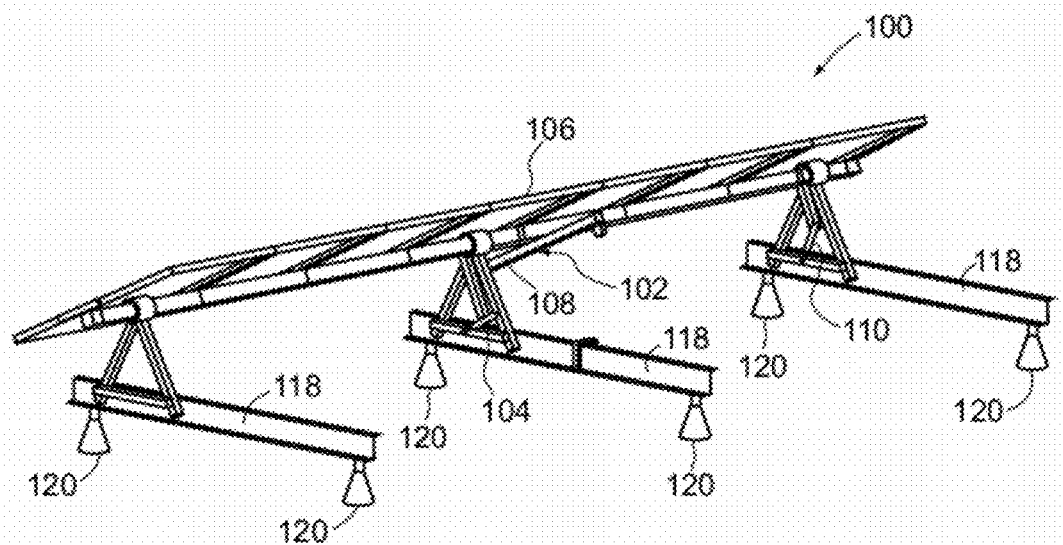
FIG. 1 shows a single row embodiment.

Embodiments of this invention include an apparatus that completely decouples the tilt actuator from the wind design constraints and allows the rack 100 to be designed in very much the same way as a fixed rack. Another embodiment of this invention is a method of decoupling tracker mechanism 104 from wind forces on an array 106. In addition, each driven row is actuated independently through a common drive unit. Embodiments of the invention use ballasts 605 to guarantee an upper load on an actuator system as depicted in the figures. Wind tunnel data is used to provide moments on each row as a function of row panel area, windspeed, and wind direction. The ballast loads are then tuned to provide positive tracking control up to a chosen wind speed at which point the rack 100 is allowed to blow to a mechanically limited stop position. By designing the actuator 102 in this manner, the wind loads are evenly distributed among the array 106 rather than channeled through the actuator system 102. The actuator system 102 may be designed to 20 mph wind speeds in a 70 mph wind zone for example. This allows design for a force of about 8% which is $20^2/70^2$.

FIG. 1 shows a single row model rack 100. One set up has a spacing of ~10 feet between adjacent rows and the axis down the center of the square tube runs N-S. The "mechanical lock assembly" 104 and "actuator bar" 108 are seen in the center of the picture and the "dampener assembly" is seen on the right.

Figure 2:
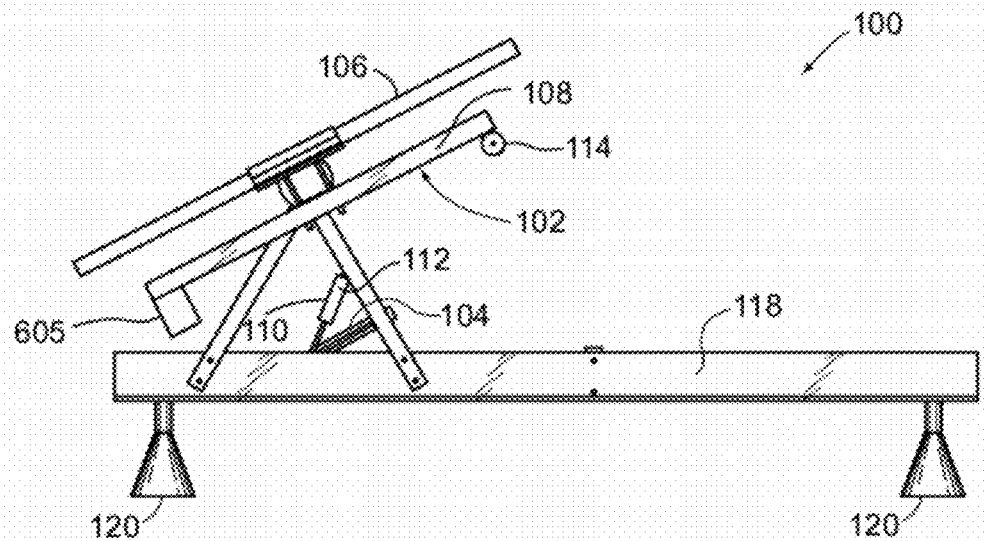
FIG. 2 shows a side view of the embodiment shown in FIG. 1).

FIG. 2 shows a side view of the rack 100.

Figure 3:
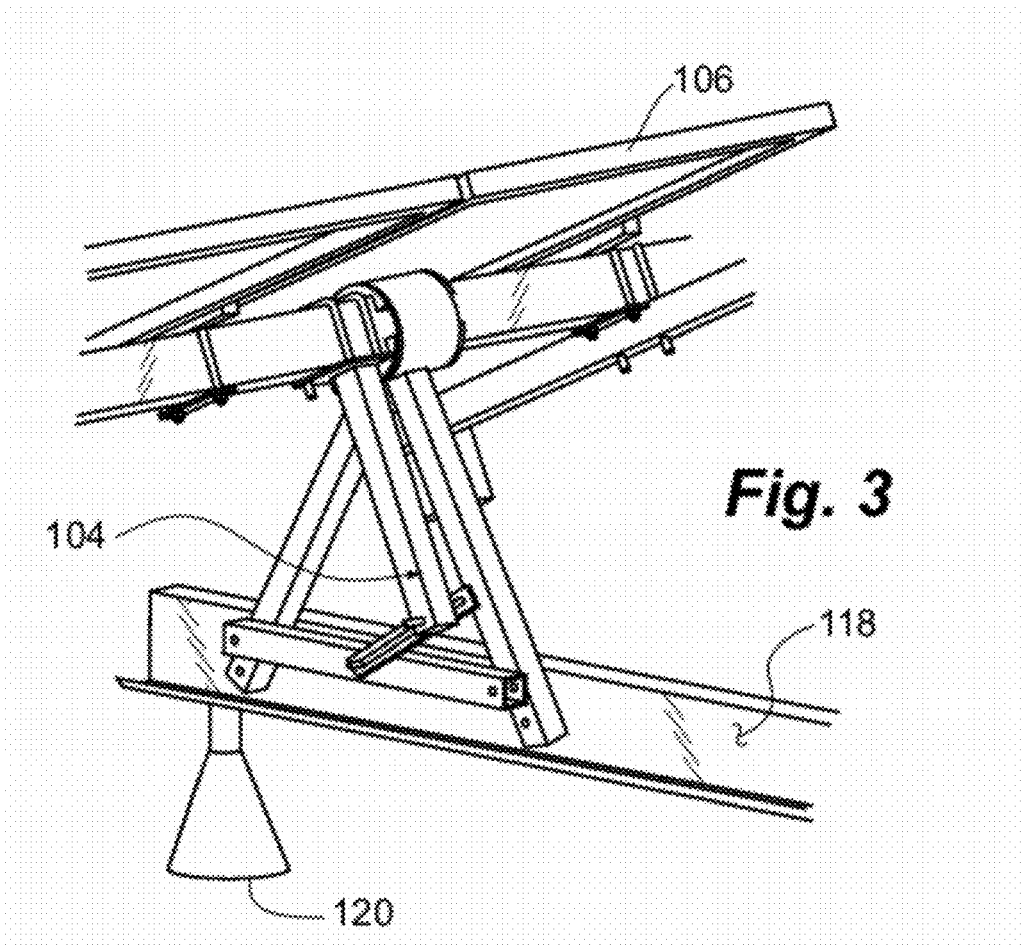
FIG. 3 shows a close up of the mechanical lock assembly of the embodiment shown in FIG. 1.

FIG. 3 shows a close-up of the mechanical lock assembly 104. The mechanical lock assembly 104 is a type of four-bar linkage. Since this rack 100 is designed to "let go" under higher wind speeds (the specific let-go speed is determined in conjunction with the counterweight size), the rack needs a method to constrain the rotation bounds. This unit 104 then transmits all additional force into the local structure providing a distributed roof loading which is very important in a roof-top tracker. It also allows the user to guarantee an upper limit on the actuator loading 102.

Figure 4:
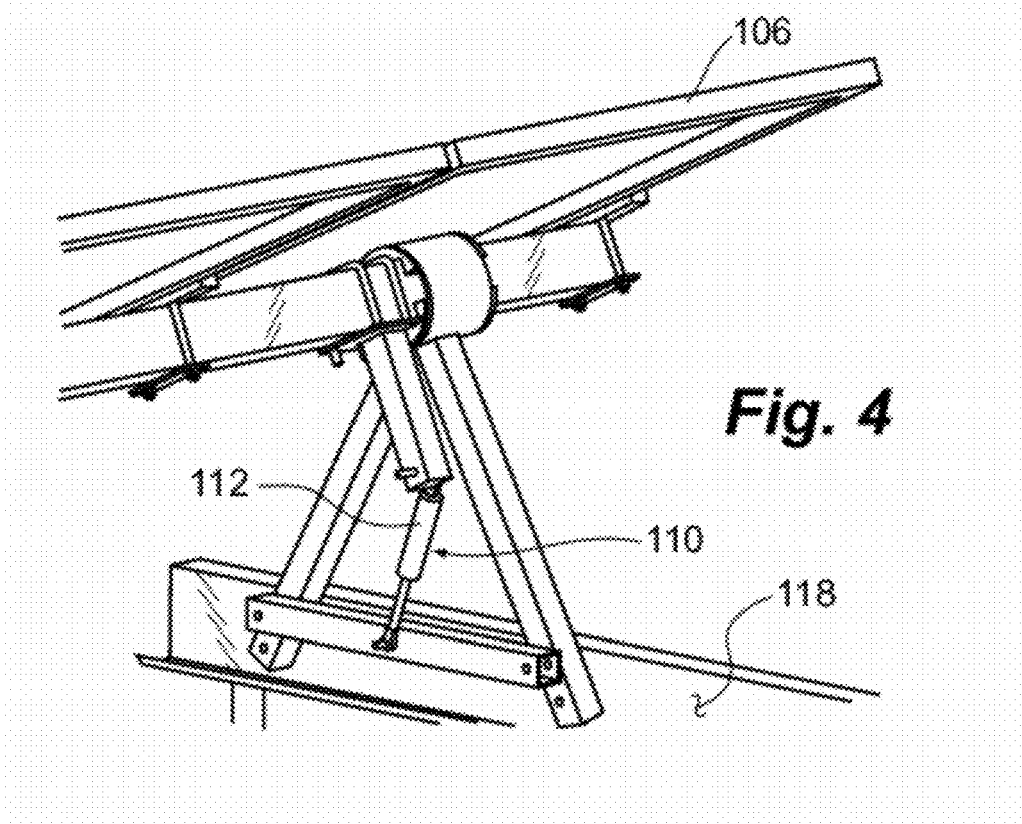
FIG. 4 shows a close up of the dampener assembly of the embodiment shown in FIG. 1.

FIG. 4 shows the "dampener assembly" 110. An embodiment uses a modified truck shock 112 that has equal dampening in both extension and compression. However, since this design only uses extension, any standard car shock, or other shock absorber, without gas pre-load would work.

Figure 5:
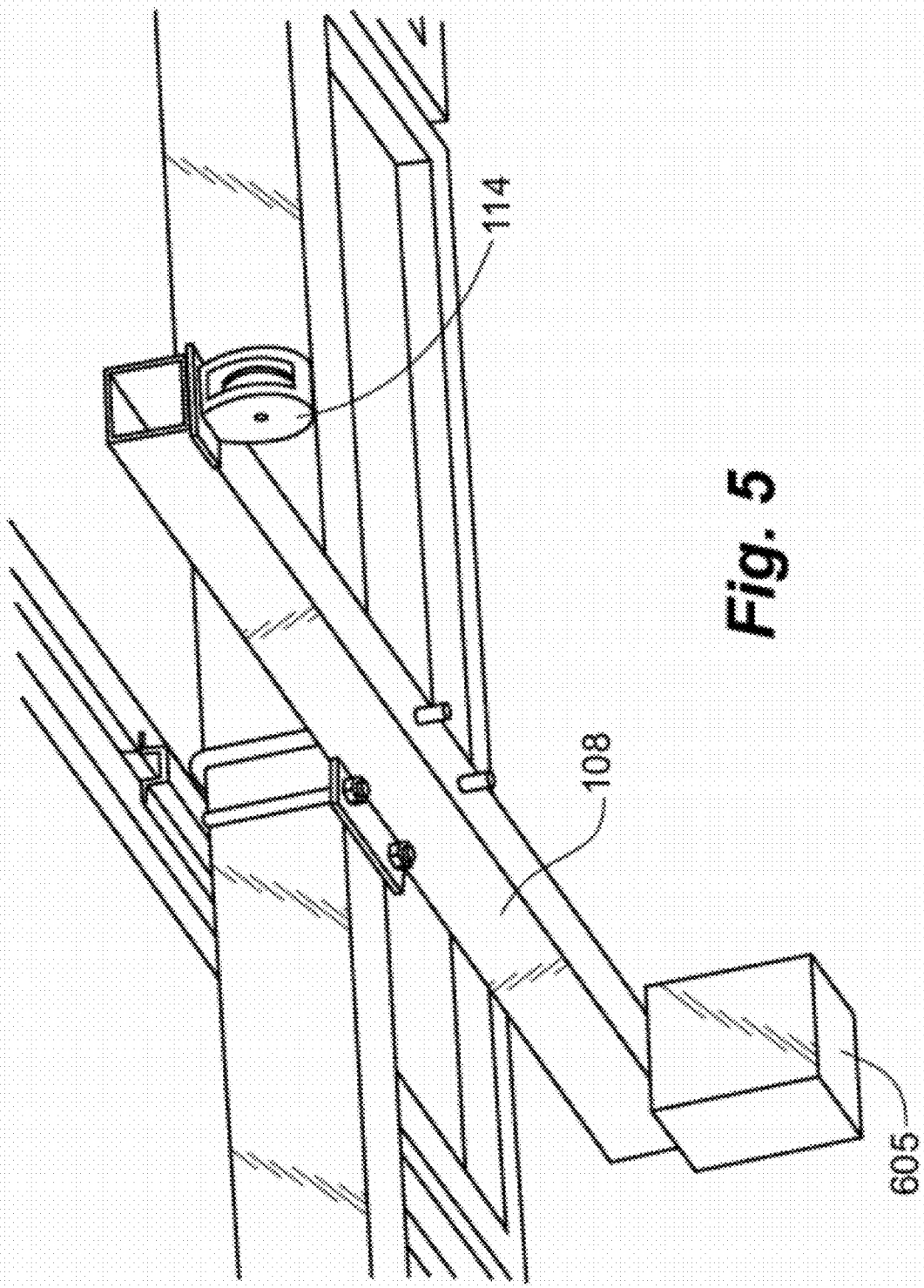
FIG. 5 shows a close up of the actuator bar of the embodiment shown in FIG. 1.

FIG. 5 shows the "actuator bar" 108. The counterweight 605 on one end provides a constant torque around the rack 100 which will tend to always tilt it to one side. This tendency is countered by the actuator 102 setup that will be described later. An important difference between this approach and a "passive tracker" is that the passive tracker relies on a balanced center of gravity, usually refrigerant that is exposed to the sun. This system 100 is positively controlled and will always have a restoring force equal to the counterweight 605 chosen.

Figure 6:
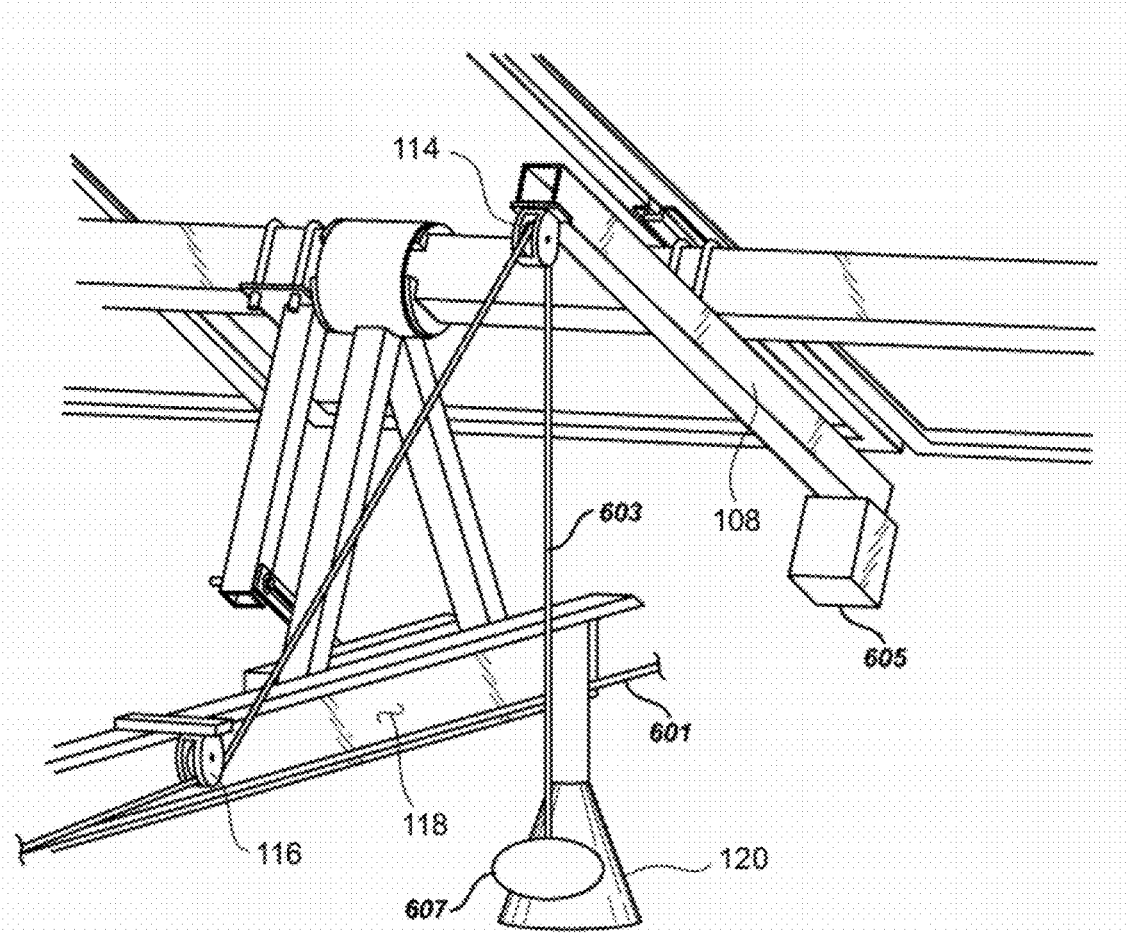
FIG. 6 shows a close up of the actuator bar and the two pulleys that link it to the main cable of the embodiment shown in FIG. 1.

FIG. 6 shows the actuator bar 108 and the two pulleys 114, 116 that link it to the main cable 601. The way this rack 100 functions is to use a system of two cable types. A main cable 601 runs linearly down the Z channel 118 shown in the photo. This cable 601 will transmit the actuator drive force to each row independently through secondary cables 603 that run through the pulley 114 shown on the end of the actuator bar 108 opposite the counter weight 605. This cable 603 is then attached to a weight 607 resting on the roof (or protective surface or wear pad). This weight 607 is 2× the counterweight 605 (assuming equal moment arms). The drive of the rack 100 is therefore to always have that weight 607 resting on the roof, but with a tension in the secondary cable 603 equal to that of the counter weight 605.

Under higher winds, one of two things may happen. 1) With a wind blowing into the page, the rack 100 may pick up this weight 607 sitting on the roof until it reaches a mechanically locked position through the "mechanical lock assembly" 104. 2) With the wind blowing out from the page, the rack 100 may rotate the rack the other way and introduce some slack into the secondary cable 603 attaching the weight 607 on the roof to the main drive cable 601, until it becomes locked through the mechanical lock assembly 104.

In either of these two conditions, the maximum pull introduced to the main drive cable 601 from the secondary cable 603 of one row is that of the counterweight 605. Therefore, if there are 50 rows driven by one actuator and each row has a 25 pound counterweight, then an actuator capable of withstanding at least 1250 pounds will be necessary. Since the main cable 601 is the only cable subjected to this force and it is in a straight line down the array 106, very little structure is required to deal with this loading. The secondary cables 603 in this example would be subjected to no more than roughly 25 pounds.

Another important aspect mentioned is that this array 106 is driven independently. All rows will tend to keep the weight on the roof sitting there with 25 pounds tension in their own secondary cables 603, but each of these rows is driven independently of each other in terms of when they "let go". It is possible, therefore, to drive each row with a common actuator unit and single main cable 601, but it is not necessary to design the secondary cables 603 and rack structure for a compounding loading due to the actuator.

Finally, the rows are highly dampened to prevent high intermittent winds from interfering with the tracking. The dampener 110 also removes the possibility of the weights 605, 607 slamming into the roof or of the rack 100 rotating quickly and breaking when the mechanical lock assembly 104 locks out.

The module clamps shown and the square tube to circular housing bushings are parts that are known. The 4" steep tube is standard. The Z channel 118 and connection posts 120 to attach to the roof are borrowed from a "standard rack" design.

What is claimed is:

1. An active tracking solar assembly comprising:
   a main actuator cable;
   a secondary cable having a first end and a second end, wherein the first end is connected to the main actuator cable and the second end is connected to a roof weight; and
   an actuator bar having a counter weight attached to a first end and a first pulley attached to a second end, wherein the secondary cable engages the first pulley.

2. The active tracking solar assembly of claim 1 wherein the actuator bar is coupled to a rack.

3. The active tracking solar assembly of claim 2 wherein the actuator bar is coupled to the rack such that rotation of the actuator bar results in rotation of the rack.

4. The active tracking solar assembly of claim 3 further comprising at least one solar panel coupled to the rack.

5. The active tracking solar assembly of claim 3 wherein the actuator bar has a mid-point, and wherein the actuator bar is coupled to the rack at its mid-point.

6. The active tracking solar assembly of claim 2 further comprising a dampener assembly coupled to the rack, wherein the dampener assembly is configured to dampen rotation of the rack.

7. The active tracking solar assembly of claim 2 further comprising a lock assembly coupled to the rack, wherein the lock assembly is configured to constrain rotation of the rack within a predetermined range of motion.

8. The active tracking solar assembly of claim 1 further comprising a second pulley coupled to a member, wherein the main cable engages the second pulley.

9. An active tracking solar assembly comprising:
   a rotatable rack configured to support at least one solar panel;
   an actuator bar coupled to the rotatable rack such that rotation of the actuator bar results in rotation of the rack, the actuator bar having a counter weight attached to a first end and a first pulley attached to a second end;
   a main actuator cable; and
   a secondary cable having a first end a second end, wherein the first end is connected to the main actuator cable and the second end is connected to a roof weight, and wherein the secondary cable engages the first pulley.

10. The active tracking solar assembly of claim 9 wherein the actuator bar has a mid-point, and wherein the actuator bar is coupled at its mid-point to the rack.

11. The active tracking solar assembly of claim 9 wherein the tension in the secondary cable is about equal to a weight of the roof weight.

12. The active tracking solar assembly of claim 9 wherein the roof weight has a weight of about two times that of the counter weight.

13. The active tracking solar assembly of claim 9 further comprising a dampener assembly coupled to the rack, wherein the dampener assembly is configured to dampen motion of the rack about its longitudinal axis.

14. The active tracking solar assembly of claim 9 further comprising a lock assembly coupled to the rack, wherein the lock assembly is configured to constrain rotation of the rack about its longitudinal axis within a predetermined range of motion.

15. The active tracking solar assembly of claim 14 wherein the lock assembly comprises a four-bar linkage.

16. An active tracking solar assembly comprising:
    a rotatable rack configured to support at least one solar panel;
    an actuator bar coupled to the rotatable rack such that rotation of the actuator bar results in rotation of the rack, the actuator bar having a counter weight attached to a first end and a first pulley attached to a second end;
    a main actuator cable;
    a secondary cable having a first end and a second end, wherein the first end is connected to the main actuator cable and the second end is connected to a roof weight, and wherein the secondary cable engages the first pulley; and
    a lock mechanism comprising a four-bar linkage, the lock mechanism coupled to the rack and configured to limit rotation of the rack to a predetermined position and secure the rack in the predetermined position when the rack is rotated to the predetermined position, wherein when the rack is secured in the predetermined position the lock mechanism is configured to transmit loads applied to the rack through the four-bar link to a support structure coupled to the rack.

17. The active tracking solar assembly of claim 16 wherein the rack is configured to be rotated to the predetermined position when loads applied to the rack by wind exceed a predetermined amount.

18. The active tracking solar assembly of claim 16 further comprising a dampener assembly coupled to the rack, wherein the dampener assembly is configured to dampen motion of the rack about its longitudinal axis.

19. The active tracking solar assembly of claim 16 wherein the roof weight has a weight of about two times that of the counter weight.

* * * * *